United States Patent [19]

Okuyama et al.

[11] Patent Number: 5,654,967
[45] Date of Patent: Aug. 5, 1997

[54] DELAY-IN-FRAMES CORRECTING SYSTEM IN A PCM TRANSMISSION LINE

[75] Inventors: Yuzo Okuyama; Satoshi Kakuma, both of Kawasaki, Japan

[73] Assignee: Fujitsu Limited, Kawasaki, Japan

[21] Appl. No.: 565,035

[22] Filed: Nov. 30, 1995

Related U.S. Application Data

[63] Continuation of Ser. No. 308,215, Sep. 19, 1994, abandoned, which is a continuation of Ser. No. 929,596, Aug. 17, 1992, abandoned.

[30] Foreign Application Priority Data

Aug. 16, 1991 [JP] Japan ..................... 3-206041

[51] Int. Cl.$^6$ .................................................. H04L 12/56
[52] U.S. Cl. .................................. 370/375; 370/517
[58] Field of Search ......................... 370/58.1, 58.2, 370/58.3, 59, 60, 60.1, 65, 94.1, 108, 105.3, 103, 100.1, 105.1; 340/826, 825.03; 375/371, 354; 371/1; 455/34.1, 136, 139, 8, 9, 10, 17, 18; 348/385, 387, 466, 470

[56] References Cited

U.S. PATENT DOCUMENTS

| | | | |
|---|---|---|---|
| 4,206,322 | 6/1980 | Lurtz | 370/63 |
| 4,495,615 | 1/1985 | Wilcke | 370/58.1 |
| 4,536,870 | 8/1985 | Bovo et al. | 370/63 |
| 4,661,946 | 4/1987 | Takahashi et al. | 370/58.1 |
| 4,701,907 | 10/1987 | Collins | 370/63 |
| 5,051,990 | 9/1991 | Kato | 370/105.3 |
| 5,130,978 | 7/1992 | Mobasser | 370/94.1 |
| 5,130,986 | 7/1992 | Doshi et al. | 370/94.1 |
| 5,140,584 | 8/1992 | Suzuki | 370/94.1 |
| 5,212,686 | 5/1993 | Joy et al. | 370/94.1 |

FOREIGN PATENT DOCUMENTS

| | | |
|---|---|---|
| 0 057 758 | 8/1982 | European Pat. Off. . |
| 0 229 365 | 7/1987 | European Pat. Off. . |
| 2 301 136 | 9/1976 | France . |
| 2 634 082 | 1/1990 | France . |
| 2 000 418 | 1/1979 | United Kingdom . |

OTHER PUBLICATIONS

Second IEEE National Conference on Communications, 2 Apr. 1989, York UK, pp. 321–326 XP130153, Maddern 'Analysis of multi-slot connections', p. 321, right col., line 50, Figure 4.

*Primary Examiner*—Douglas W. Olms
*Assistant Examiner*—Ajit Patel
*Attorney, Agent, or Firm*—Staas & Halsey

[57] ABSTRACT

A delay-in-frames correction system in a switch unit in a PCM transmission line is used for data communication. A channel data storage unit is provided to temporarily store data corresponding to each channel on the output side or the input side of the switch unit in each direction in the PCM transmission line. A data delay control unit delays data among the data corresponding to channels and stored in the channel data storage unit. The data corresponding to a plurality of channels is output in order in the same frame and delayed by the number of frames indicated by the most delayed data corresponding to channels to provide frame correction instruction information for outputting a data string in the same frame.

19 Claims, 17 Drawing Sheets

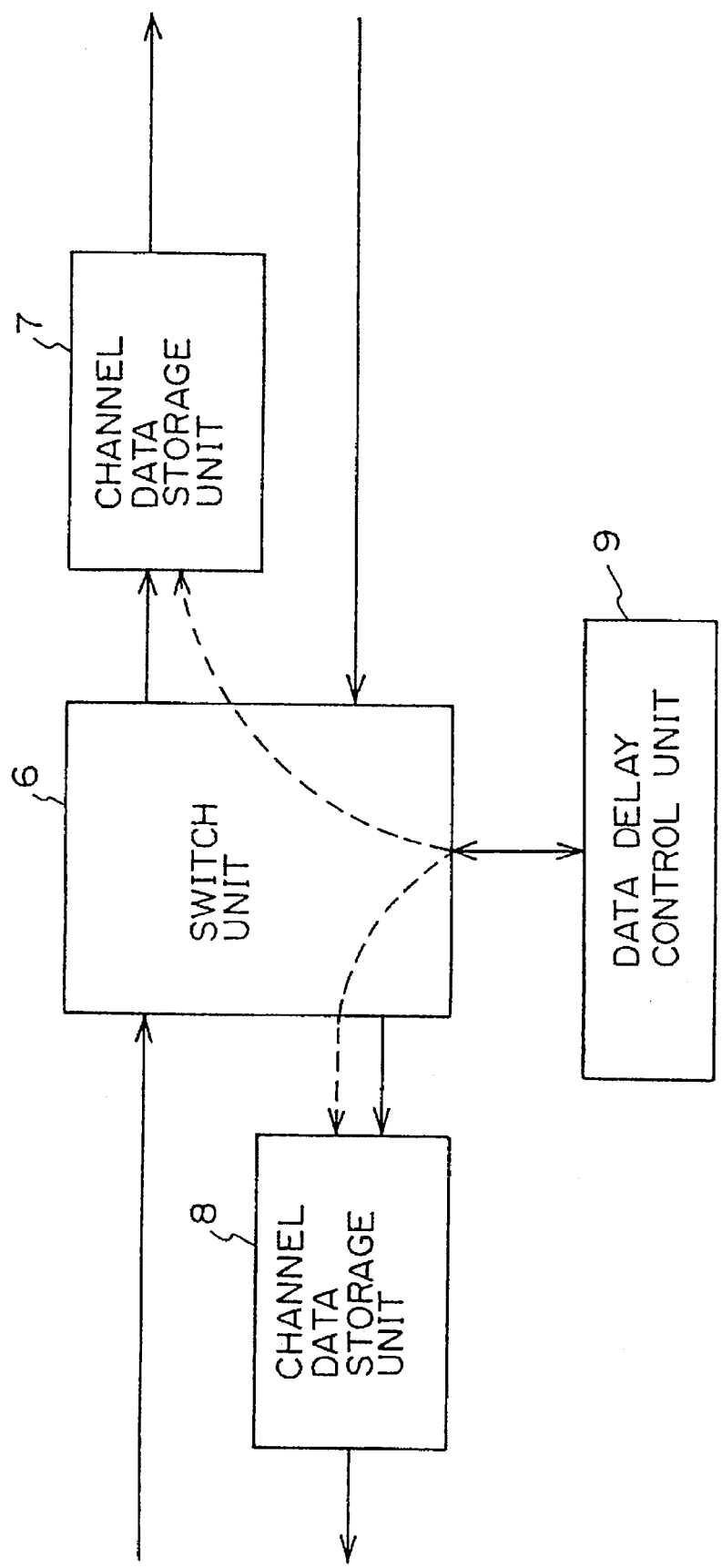

| CHANNEL POSIT-ION OF DATA IN $\alpha_1$, $\alpha_2$, AND $\alpha_3$ | DELAY IN FRAME (FRAME POSITION OF DATA IN $\alpha_3$) |
|---|---|
| $\begin{bmatrix} \alpha_1 \leq \alpha_2 < 510 \\ \alpha_2 + 513 \leq \alpha_3 \end{bmatrix}$ | FRAME N → FRAME N |
| $\begin{bmatrix} \alpha_1 \leq \alpha_2 < 510 \\ \alpha_2 + 513 \leq \alpha_3 \end{bmatrix}$ $\begin{bmatrix} \alpha_1 \leq \alpha_2, \alpha_2 \geq 511 \\ \alpha_2 - 511 \leq \alpha_3 \end{bmatrix}$ $\begin{bmatrix} \alpha_1 > \alpha_2, \alpha_2 < 511 \\ \alpha_2 + 511 \leq \alpha_3 \end{bmatrix}$ | FRAME N → FRAME N+1 |
| $\begin{bmatrix} \alpha_1 > \alpha_2, \alpha_2 < 511 \\ \alpha_2 + 513 > \alpha_3 \end{bmatrix}$ $\begin{bmatrix} \alpha_1 > \alpha_2, \alpha_2 \geq 511 \\ \alpha_2 - 511 \leq \alpha_3 \end{bmatrix}$ $\begin{bmatrix} \alpha_1 \leq \alpha_2, \alpha_2 \geq 511 \\ \alpha_2 - 511 > \alpha_3 \end{bmatrix}$ | FRAME N → FRAME N+2 |
| $\begin{bmatrix} \alpha_1 > \alpha_2, \alpha_2 \geq 511 \\ \alpha_2 - 511 > \alpha_3 \end{bmatrix}$ | FRAME N → FRAME N+3 |

Fig. 6

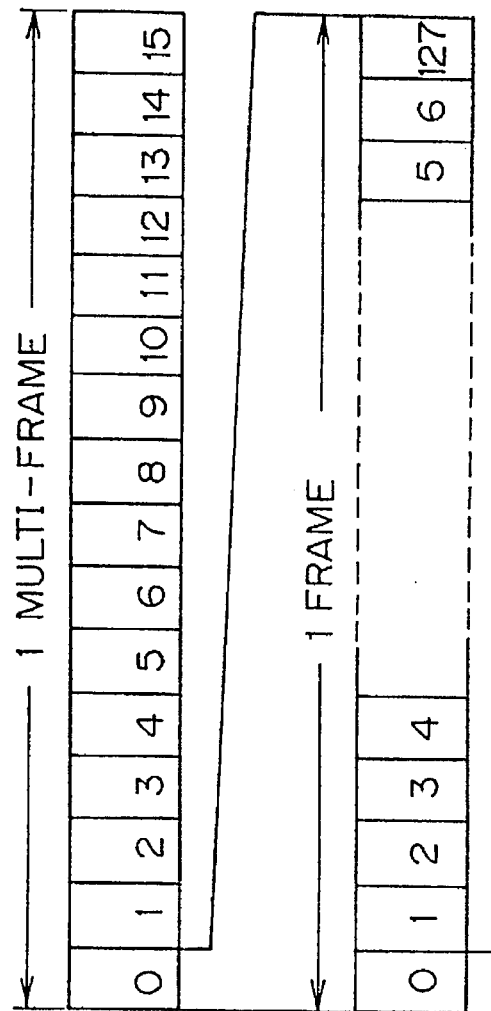
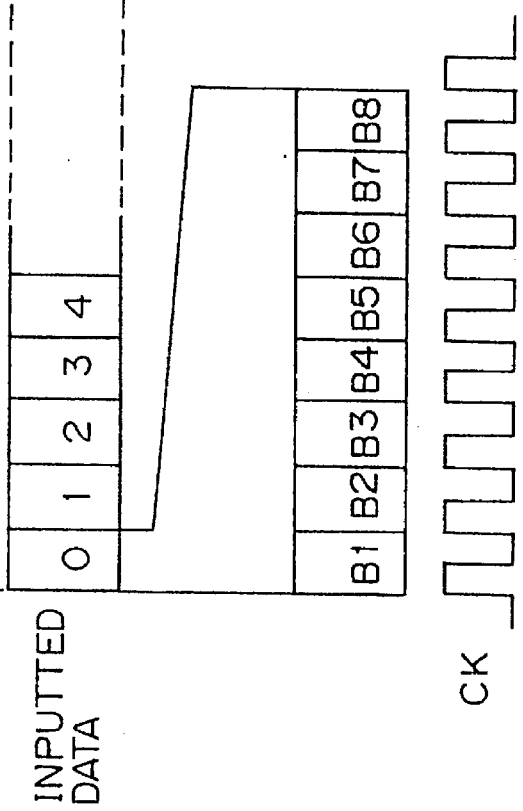
Fig. 9A
Fig. 9B
Fig. 9C

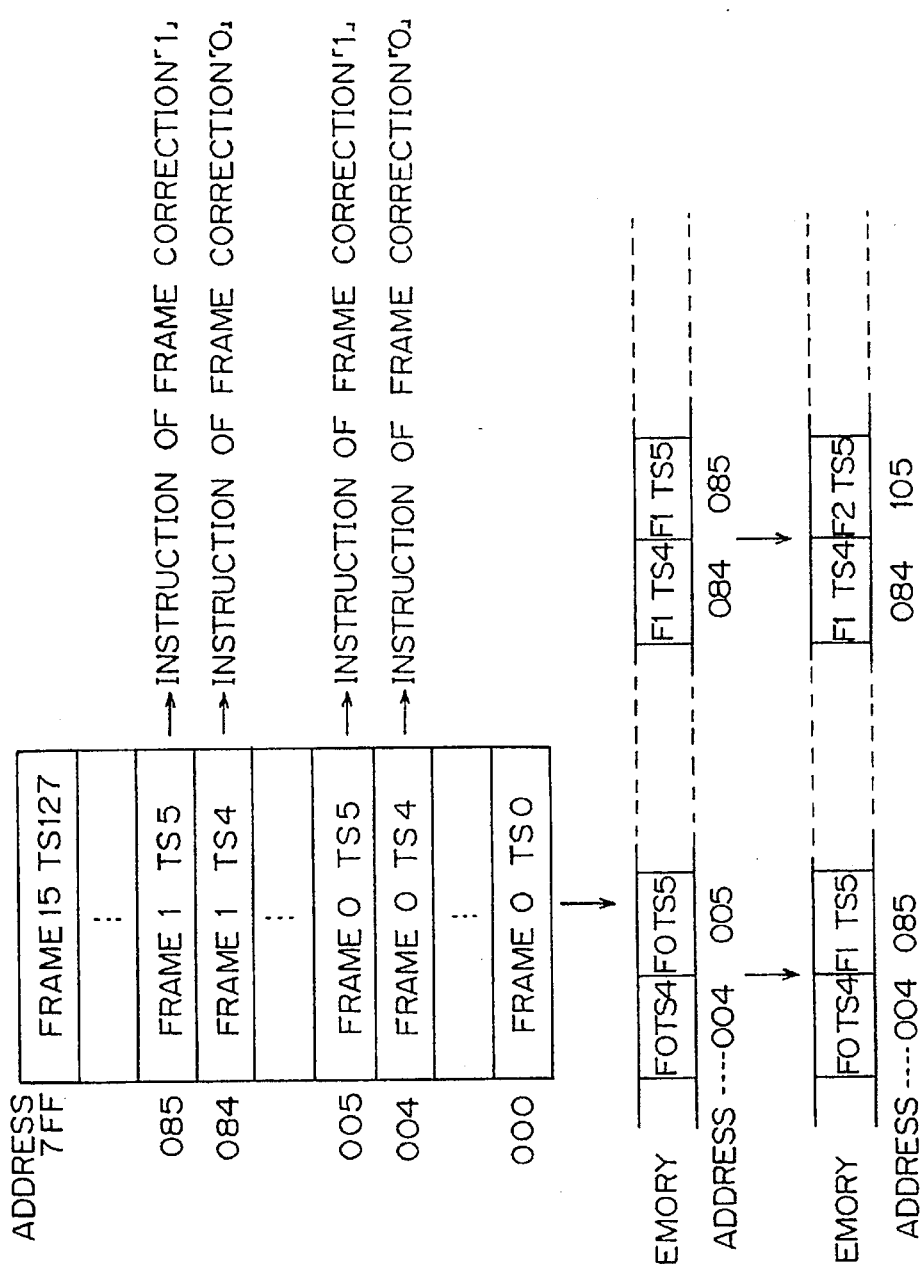

| FRAME No. | B1 | B2 | B3 | B4 | B5 | B6 | B7 | B8 |
|---|---|---|---|---|---|---|---|---|
| 0 | FLAG | TS No. DESIGNATION | | | | | | |
| 1 | | | | | FRAME CORRECTION INSTRUCTION INFORMATION D0 | D1 | D2 | D3 |
| 2 | | | | | | | | |
| 3 | | | | | | | | |
| 4 | | | | | | | | |
| 5 | | | | | | | | |
| 6 | | | | | | | | |
| 7 | | | | | | | | |
| 8 | | | | | | | | |
| 9 | | | | | | | | |
| 10 | | | | | | | | |
| 11 | | | | | | | | |
| 12 | | | | | | | | |
| 13 | | | | | | | | |
| 14 | | | | | | | | |
| 15 | | | | | | | | |

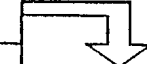

$0000: F_n \rightarrow F_n$
$0001: F_n \rightarrow F_{n+1}$
$0010: F_n \rightarrow F_{n+2}$
$0011: F_n \rightarrow F_{n+3}$
$0100: F_n \rightarrow F_{n+4}$
$0101: F_n \rightarrow F_{n+5}$
$0110: F_n \rightarrow F_{n+6}$
$0111: F_n \rightarrow F_{n+7}$
$1000: F_n \rightarrow F_{n+8}$
$1001: F_n \rightarrow F_{n+9}$
$1010: F_n \rightarrow F_{n+10}$
$1011: F_n \rightarrow F_{n+11}$
$1100: F_n \rightarrow F_{n+12}$
$1101: F_n \rightarrow F_{n+13}$
$1110: F_n \rightarrow F_{n+14}$
$1111: F_n \rightarrow F_{n+15}$

Fig. 11

Fig. 12A  DATA INPUTTED TO 1 FRAME: 0, 1, 2, 3, 4, ..., 5, 6, ch.127

DELAY-IN-FRAMES CORRECTING SYSTEM IN A PCM TRANSMISSION LINE

This application is a continuation, of application Ser. No. 08/308,215, filed Sep. 19, 1994, now abandoned, which is a continuation, of application Ser. No. 07/929,596, filed Aug. 17, 1992, now abandoned.

BACKGROUND OF THE INVENTION

The present invention relates to data communication, specifically to a delay-in-frames correcting system in a PCM transmission line for correcting delays of data in frames at a switch unit in the PCM transmission line.

The system configuration shown in FIG. 1 is used in transmitting data between a subscriber terminal and another subscriber terminal in wide-band data transmission using, for example, 64 Kbps×N (N equals 1–30 channels) in a PCM transmission line (2.048 MHz in Europe, and 1.544 MHz in the U.S. and Japan).

In FIG. 1, subscriber terminals A and B are connected to a PCM transmission line terminal unit (DT) 1 through a PCM transmission line L. 2 is a digital terminal common (hereinafter abbreviated as DTC). A delay-in-frames arises at a Switch unit 3 having a configuration T-S-T, for example.

The above described switch unit 3 comprises a multiplexer (MPX) 4 for multiplexing a transmission signal, a primary time switch TSW1, a space switch SSW, a secondary time switch TSW2, and a demultiplexer (DMPX) 5. The primary time switch TSW1 and the secondary time switch TSW2 comprise memories MEM1 and MEM2 individually.

The above described PCM transmission line L is set to 2.048 MHz in Europe and 1.544 MHz in the U.S. and Japan, carrying 64 Kbps data per channel (ch). This enables the data transmission of 64 Kbps×30 channels at maximum in Europe and 64 Kbps×24 channels at maximum in the U.S. and Japan. For example, in transmitting video signals each carrying 384 Kbps data, a signal is transmitted through 6 channels (64 Kbps×6=384 Kbps).

FIG. 2A shows the data configuration of 128 channels on the output side of the DTC 2 shown in FIG. 1, that is, the input side of the switch unit 3. In the configuration, control channels TS 0–TS 3 control the PCM transmission line terminal unit 1; TS 4–TS 63 and TS 68–TS 127 are voice channels; and TS 64–TS 67 are call control channels. That is, the data comprises 120 voice channels and 8 control channels.

Eight units of the above described data form one block, and are multiplexed by the multiplexer 4 to finally form 1024 channels shown in FIG. 2B. Then, they are switched through the primary time switch TSW1, the space switch SSW, and the secondary time switch TSW2, demultiplexed by the DMPX 5, and transmitted to the subscriber B through the DTC 2 and the DT 1. The path of this signal is shown in FIG. 1 as a bold line.

The method of transmitting data from a terminal to the input side of the primary time switch in the switch unit 3 is described below in detail. A line is connected to each of the digital terminals 1 shown in FIG. 1, and the digital terminal common 2 multiplexes/demultiplexes the data applied from a plurality of lines. In Europe, 1 line equals 30 channels, and 4 lines are connected to the digital terminal commons 2. In the U.S., 1 line equals 24 channels, and 5 lines are connected to the DTCs 2.

The DTCs 2 are operated as an interface between the digital terminals 1 and the switch unit 3. They multiplex/demultiplex data for the voice channels, transmit an operation mode of the DT1 through the control channel, and notify the switch unit 3 of the alarm state of the PCM transmission line L.

Each memory in the primary time switch TSW1 and the secondary time switch TSW2 has the capacity of 1028 channels and receives data consisting of 128 channels from each of the DTCs 2. Therefore, the MPX 4 and the DMPX 5 shown in FIG. 1 multiplex/demultiplex signals for eight DTCs 2.

In the flow of a signal described above, data may delay in frames at the switch unit 3. Assume that, for example, information comprising three data A, B, and C are applied to the switch unit 3. When the information is switched and outputted, the data in channel C can delay and enter the frame next to its own frame. The delay may be caused by an erroneous allocation of the memory MEM1 in the primary time switch SW1 or the memory MEM2 in the secondary time switch SW2.

Thus, information comprising three data pieces A, B, and C often becomes meaningless if they suffer delays in their frames during the switching operation.

FIG. 3 shows how the delays-in-frames take place. In FIG. 3, $\alpha_1$ indicates the state of each signal on the input side of the primary time switch TSW1; $\alpha_2$ indicates the state of each signal between the primary time switch TSW1 and the secondary time switch TSW2; and $\alpha_3$ indicates the state of each signal on the output side of the secondary time switch TSW2, wherein frames are named frame N, frame N+1, frame N+2, . . . , each comprising 1024 channels from channel 0 to channel 1023.

In FIG. 3, data A in channel 0 in the state $\alpha_1$, for example, delay a little in phase and enter the second channel in the state $\alpha_2$. Then, they enter the 514th channel in the state $\alpha_3$. However, they are still in frame N, the same frame as that in which the data were inputted. In the meantime, data B in the second channel in the state $\alpha_1$ enters frame N+1 in the state $\alpha_3$, and data C in the 510th channel in the state $\alpha_1$ enters frame N+2 in the state $\alpha_3$. Thus, they delay and enter the frames different from those where they were in when inputted.

As described above, data can be detected in the different frames on their input and output sides of the switch unit 3.

In FIG. 3, the output frame of the secondary time switch TSW2 leads by 513 time slots because the upstream data and downstream data are allocated separately in the switch unit. FIG. 4 shows the difference in the allocation. Assuming that, in FIG. 4, the transmission line from terminal A to terminal B is an upstream line and that from terminal B to terminal A is a downstream line, a channel allocated the state $\alpha_2$ in the upstream path is allocated $\alpha_2$+512 in the downstream path. Therefore, the output side of the upstream path leads by 513 time slots.

When data are transmitted in the PCM transmission line through the wide-band of 64 Kbps×Nch (N equals 30 channels in Europe, and 24 channels in the U.S. and Japan), video data are transmitted through 64 Kbps×6 channels, wherein the data in 1–6 channels must be transmitted at the same timing. Therefore, as described above, a delay of data in frames caused in the switch unit 3 must be corrected appropriately.

To correct the delays, the prior art technology controls such that the necessary number of channels are retained in order and a significant data string is outputted in the same frame without data delays in frames under software control.

However, in this method, channels cannot be allocated such that they are retained in order with a significant data string outputted in the same frame without delay when a number of calls are required, thereby causing a problem of an unpractically high call loss rate. A "call loss rate" means a rate of calls which cannot be connected to a receiving side due to the congestion at a switch unit, etc., that is, a rate of channel allocations which fails in retaining the order of data.

SUMMARY OF THE INVENTION

The present invention aims at realizing a delay-in-frames correcting system in the PCM transmission line capable of exactly retaining the order of data and reducing a call loss rate by correcting delays according to preliminarily obtained delay information.

A feature of the present invention resides in a delay-in-frames correcting system operated in a switch unit in a PCM transmission line in which each piece of data corresponding to each channel is transmitted in a frame comprising a plurality of time slots corresponding to a plurality of channels, the system comprising channel data storage means for temporarily storing data corresponding to each channel on the output side or the input side of the switch unit in each direction of the transmission line, and data delay control means for delaying data among the data corresponding to channels and stored in the channel data storage means, the data corresponding to a plurality of channels, being outputted in order in the same frame, and being delayed by the number of frames indicated by the most delayed data corresponding to channels, and for outputting frame correction instruction information for outputting a data string in the same frame.

BRIEF DESCRIPTION OF THE DRAWINGS

One of skill in the art can easily understand additional features and objects of this invention from the description of the preferred embodiments and some of the attached drawings. In the drawings:

FIG. 5 is a block diagram for explaining the principle of the present invention;

FIG. 6 shows determinative conditions on delays of data in frames;

FIGS. 9A, 9B and 9C show the data inputted from the switch unit to the DTC and clock used in the embodiment;

FIGS. 10A, 10B and 10C show the storage state in the memory and the relationship between the input and the output of the memory;

FIG. 11 shows an example of writing information to each bit from control channels;

FIGS. 12A, 12B, 12C, 12D and 12E show the frame correction instruction information for each channel of input data;

DETAILED DESCRIPTION

FIG. 5 is a block diagram for explaining a principle of the present invention, and shows the method of correcting at a switch unit the delays of data allocated to channels in the PCM transmission line for transmitting data in each frame comprising a plurality of channels.

In FIG. 5, channel data storage units 7 and 8 temporarily store data allocated to each channel. Both channel data storage units 7 and 8 are provided on the output side of the switch unit 6 in FIG. 5 but can also be located on the input side.

A data delay control unit 9 retains the order of data allocated to each channel and stored in the channel data storage units 7 and 8, and outputs a data string, which is allocated to a plurality of channels and should be outputted in the same frame, exactly in the same frame after delaying them around the point of the most delayed data in a plurality of channels.

Figure 3:
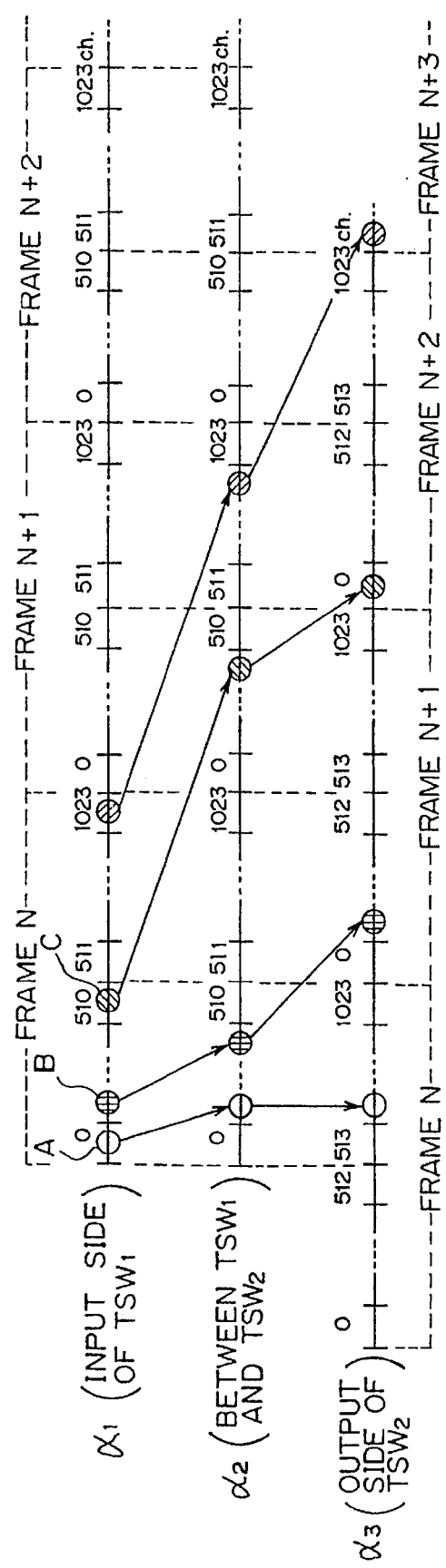
FIG. 3 shows the positions of data and the delays in frames.
Figure 4:
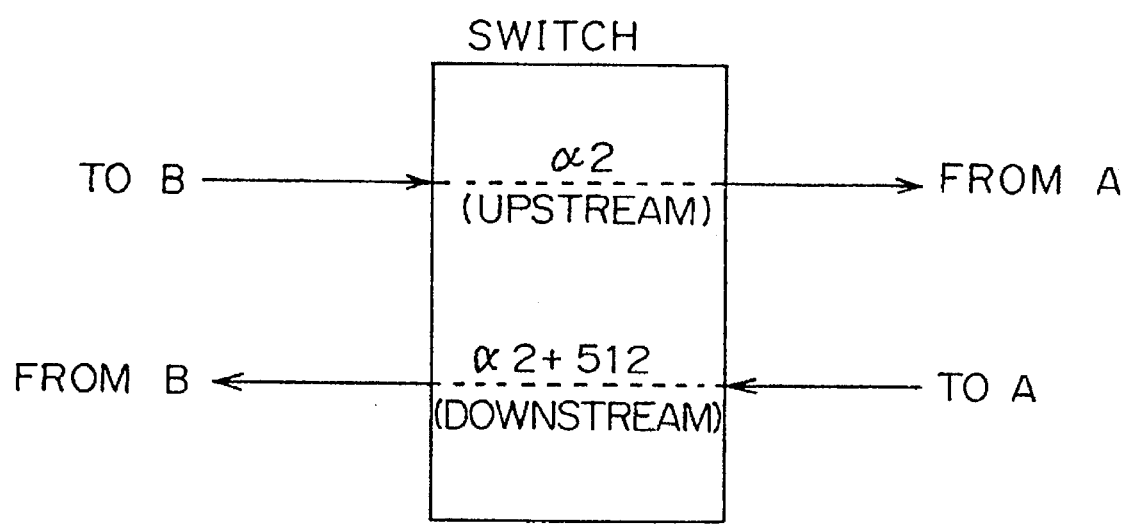
FIG. 4 is a block diagram for explaining the allocation of time slots in the switch unit.

The delay-in-frames between the data inputted to the switch unit 6 and the data outputted therefrom is explained below. The delay-in-frames is caused by the delay between the input side of the primary time switch and the output side of the secondary time switch in the switch unit 3 shown in FIG. 1. Whether or not the data inputted to the primary time switch are outputted, on the output side of the secondary time switch, in the frame in which they are inputted depends on the relationship among the signal states $\alpha_1$ on the input side of the primary time switch described by referring to FIG. 3, the signal state $\alpha_2$ between the primary time switch and the secondary time switch, and the signal state $\alpha_3$ on the output side of the Secondary time switch.

FIG. 6 shows the condition for determining the delay-in-frames. It shows the condition for determining whether a piece of data in frame N are outputted in frame N, in frame N+1 after delaying by one frame, in frame N+2 after delaying by two frames, or in frame N+3 after delaying by three frames.

In FIG. 6, if the relationship among the data states $\alpha_1$, $\alpha_2$, and $\alpha_3$ is represented as:

$$\alpha_1 \leq \alpha_2 < 510 \text{ channels and}$$

$$\alpha_2 + 513 \text{ channels} \leq \alpha_3,$$

the data are inputted in frame N and outputted in frame N, that is, they do not delay to a different frame. If $\alpha_1 \leq \alpha_2 < 510$ channels and $$\alpha_2 + 513 \text{ channels} > \alpha_3,$$

the data are inputted in frame N and outputted in frame N+1, that is, they are delayed in phase by one frame.

In the principle configuration shown in FIG. 5, data inputted to the switch 6 through the PCM transmission line can be outputted in a different frame due to a delay caused in the Switch 6. For example, data A, B, C in three channels are assumed to be inputted in the switch unit 6, and only data C among them are delayed by one frame on the output side of the switch 6.

In this case, when data A, B, and C are allocated to corresponding channels, the delay of data can be preliminarily calculated by software as explained above by referring to FIGS. 3 and 6.

Figure 1:
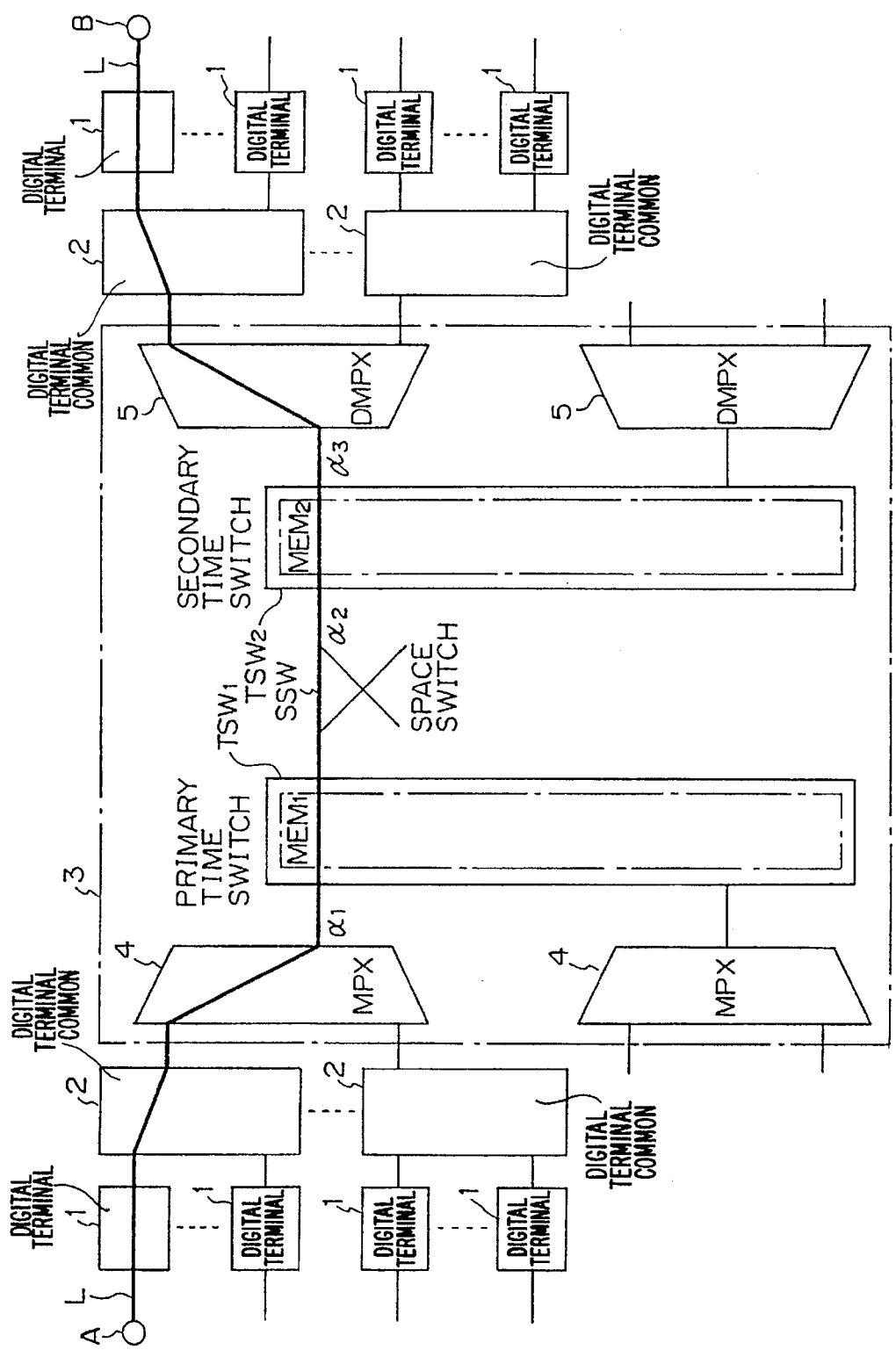
FIG. 1 is a block diagram showing the configuration of the PCM transmission system.

For example, if data C delay by one frame when data A, B, and C are inputted to the switch unit 6 shown in FIG. 5 through the PCM transmission line terminal unit 1 shown in FIG. 1, switched in the switch unit 6, and outputted therefrom, then the data delay control unit 9 receives from the software the correction value to the delay and controls the output of the data temporarily stored in the channel data storage unit 7. In this case, as data C is delayed by one frame, data A and B are controlled to be delayed by the same number of frames.

Thus, when data are allocated to corresponding channels, the anticipated delay-in-frames is calculated by the software based on the allocated channels of data, the calculation results are stored in the channel data storage unit, and the delay-in-frames at the switching of data is corrected according to the correction value provided by the software. That is, if the most delayed data are C, which indicates the largest delay value among data A, B, and C in three channels, other data A and B are also delayed corresponding to the delay value of data C in order to output data A and B in the same frame for data C. Thus, data A, B, and C are corrected to be retained in order and can be significant as one data string, thereby reducing a call loss rate.

Figure 7:
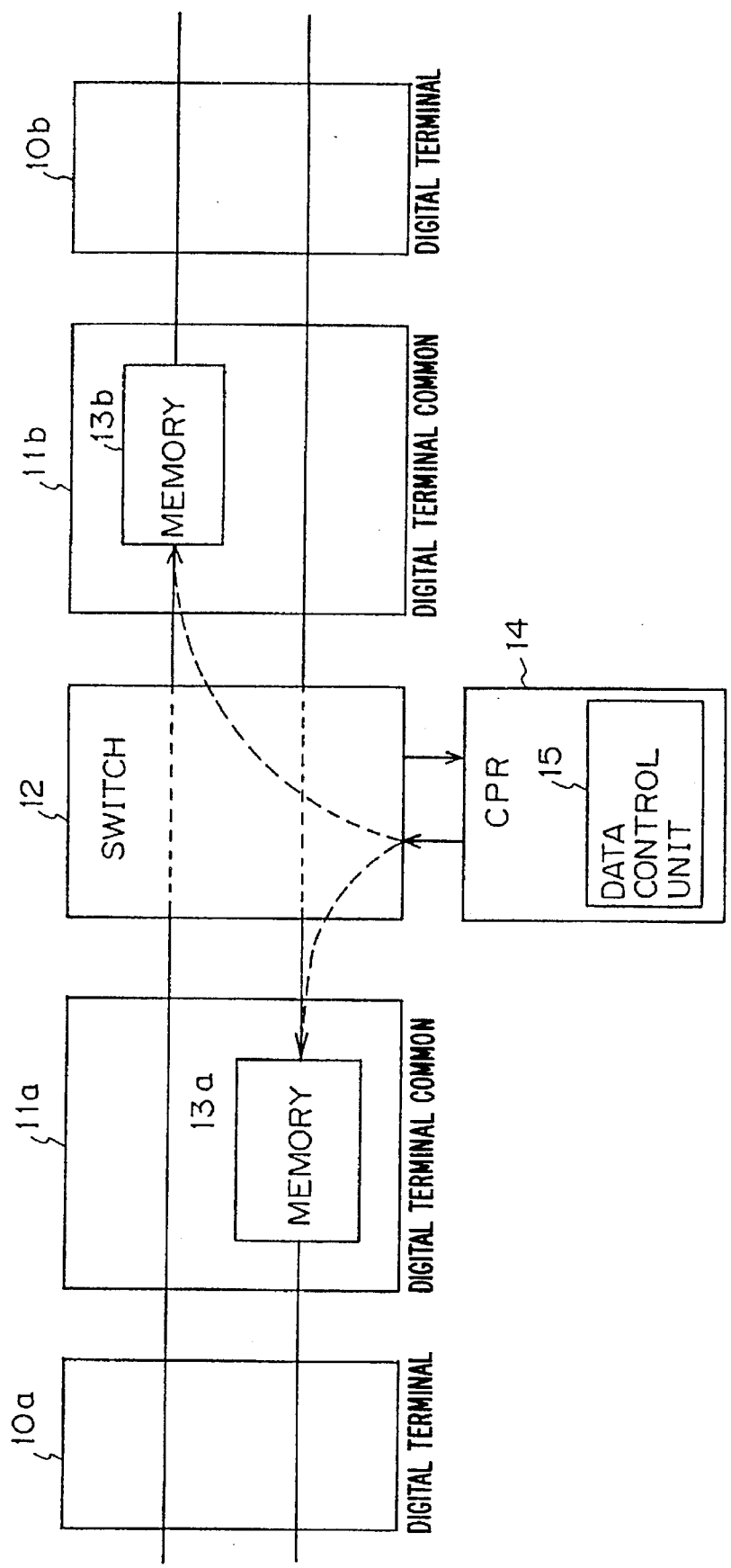
FIG. 7 is a block diagram for explaining the outline of the data delay correcting system of the present invention.

FIG. 7 is a view for explaining the outline of the delay-in-frames correcting method of the present invention.

In FIG. 7, 10a and 10b are digital terminals (DT); 11a and 11b are digital terminal common (DTC); 12 is a switch unit having the T-S-T configuration; 13a and 13b are memories corresponding to the channel data storage units 7 and 8; and 14 is a call processor (CPR) containing a data control unit 15 for controlling a read of data, etc. from memories 13a and 13b. In FIG. 7, memories 13a and 13b are provided in the DTCs 11a and 11b respectively on the output side of the switch unit 12. They can also be provided on the input side of the switch unit 12.

In FIG. 7, the data control unit 15 stores a software program for calculating the delay of data in frames. When switching control determines for data the channel allocation states $\alpha_1$, $\alpha_2$, and $\alpha_3$ as described in FIG. 6, the delay-in-frames is calculated on the condition shown in FIG. 6, and the CPR 14 controls the allocation of the path in the switch unit and the correction of the delay in frames.

Figure 8:
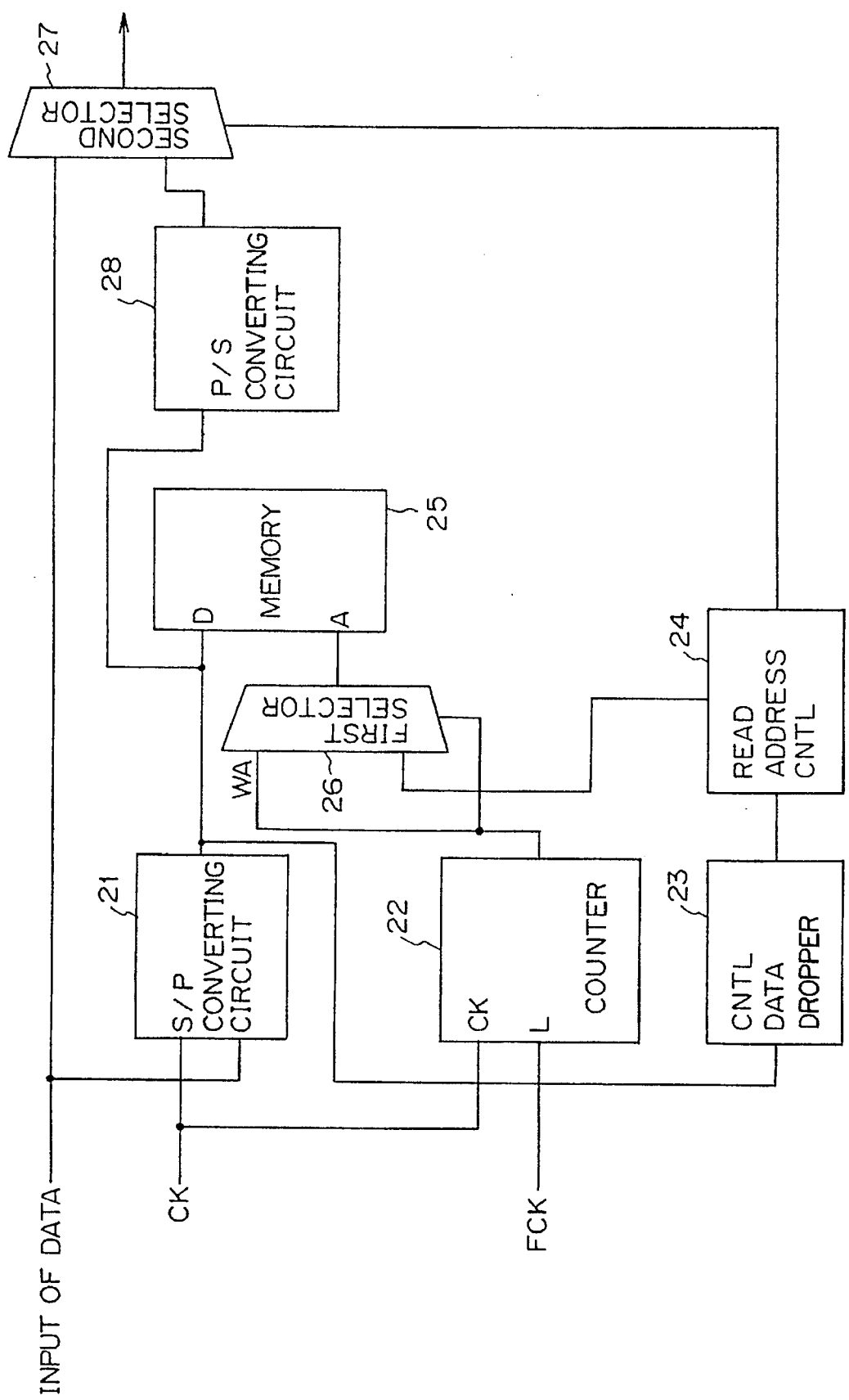
FIG. 8 is a block diagram indicating the configuration of the embodiment of the digital terminal common (DTC)

FIG. 8 shows the configuration of an embodiment of the digital terminal common (DTC) of the present invention. In FIG. 8, 21 is a serial/parallel converting circuit (hereinafter referred to as an S/P converting circuit); 22 is a counter; 23 is a CNTL data dropper; 24 is a read address CNTL; 25 is a memory; 26 is a first selector; 27 is a second selector; and 28 is a parallel/serial converting circuit (hereinafter referred to as a P/S converting circuit). FIG. 8 shows only the units directly associated with the present invention.

The data applied here have the configuration shown in FIG. 9. The data are outputted by the switch unit 12 shown in FIG. 7, and are configured in the 16-multiframe format. Each format comprises channels TS0–TS127, a total of 128 channels, and each channel comprises B1–B8, a total of 8 bits. FIG. 9B shows a clock CK; and FIG. 9C is a signal FCK indicating the leading bit of the multiframe, and outputting "1" at frame=0, TS=0, and B=1.

Figures 2A, 2B:
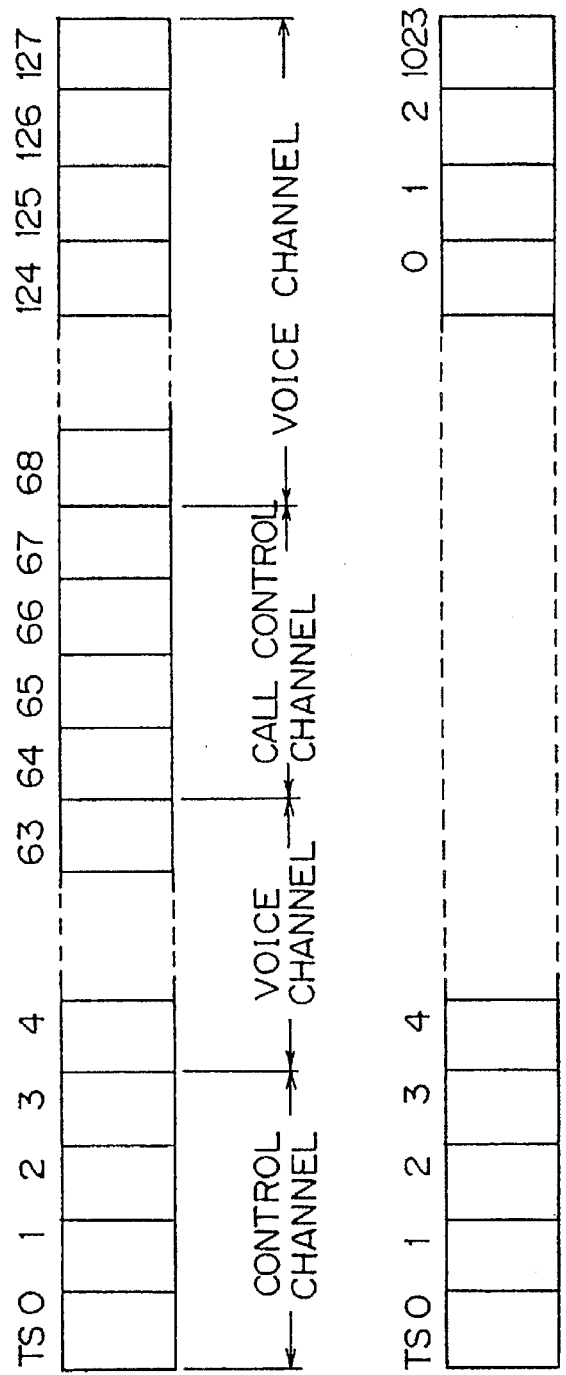
FIGS. 2A and 2B show the configuration of the data inputted to the switch unit.

In this format, one frame consists of 128 time slots, and the frame is outputted from the DMPX 5 and inputted to the DTC 2, for example, as shown in FIG. 1. As described above, the DMPX 5 demultiplexes the 1024 time slot data in the format (shown in FIG. 2) in the switch into eight lines, that is, into eight DTCs. The cycle of one frame in a switch is the same as that in a DTC.

The above described S/P converting circuit 21 performs a 8-bit parallel conversion on the data (FIG. 9A) in synchronism with the clock (FIG. 9B). The signals thus obtained are sequentially written at the address 000, 001, 002, . . . in the memory 25 starting with TS0 in frame 0 according to a write address signal (WA signal) from the counter 22. The writing operation is repeated up to TS127 in frame 15.

The software issues a frame correction instruction to each piece of written data. In FIG. 10A, for example, the frame correction instruction is "0" for the data in TS4 of frame 0 at address 004, and "1" for the data in TS5 of frame 0 at address 005.

Thus, if the frame correction instruction indicates "0", the output from a memory (read output), compared with the input to a memory (write input), is outputted in the frame where it was inputted as indicated in FIGS. 10B and 10C, while it is outputted in the frame following the one where it was inputted if the frame correction instruction indicates "1". In FIGS. 10A and 10B, "frame" is abbreviated to "F". For example, frame 0, frame 1, . . . are represented as F0, F1, . . .

For detailed explanation about FIG. 10, the horizontal direction in FIGS. 10B and 10C indicates a time axis. In FIG. 10B, data are written in a memory sequentially at input addresses. In FIG. 10C indicating memory output addresses, the data in TS5 having a correction instruction are buffered for the time for one frame and then outputted.

A frame correction instruction is issued through the control channels TS0–TS3 in the data configuration shown in FIG. 9A. In the DTC unit, the TS number designation information for designating the TS number whose frame must be corrected, a flag indicating whether or not the data is valid, and the frame correction instruction information for indicating how far the data must be moved are written to the control channel. The DTC unit receives all the above described information from the switch unit.

FIG. 11 is an example of setting for two control channels in frames 0–15 the above described flag, designating a TS number, and allocating the above described flag. In designating a TS number, seven bits are used to designate 128 TSs. Four bits of $D_0$, $D_1$, $D_2$, and $D_3$ indicate frame correction instruction and written by the software as a predetermined frame correction data. For example, if $D_0$–$D_3$ indicate 0000, the data in the channels require no frame correction. That is, frame $F_n$ is used as frame $F_n$ as is. If $D_0$–$D_3$ indicate 0001, the data in the channels must be moved by one frame from frame $F_n$ to frame $F_{n+1}$. If they indicate 0010, the data must be moved by 2 frames from frame $F_n$ to frame $F_{n+2}$.

The CNTL data dropper 23 is a circuit for dropping the above described information transmitted through the above described control channel. Each piece of the dropped information is applied to the read address CNTL 24. In the read address CNTL the frame correction instruction information $D_0$, $D_1$, $D_2$, and $D_3$ for instructing how far the data are moved are converted to data synchronized with the data shown in FIG. 9A.

That is, as shown in FIG. 12, the frame correction instruction information $D_0$–$D_3$ is converted such that it is synchronized with the data in channels 0–127 of one frame.

The frame correction instruction information $D_0$–$D_3$ corresponds to each piece of the data in channels 0–127. For example, if the data $D_0$–$D_3$ in the 0-th channel indicate 0000, the data in the 0-th channel require no frame correction. If the data $D_0$–$D_3$ in the 1-th channel indicate 0000, the data in the 1-th channel require frame correction from $F_n$ to $F_{n+1}$.

Thus, data are written to the memory 25 as shown in FIG. 8 in order to obtain the information about the delay of data, that is, the information about what data is delayed by how many frames, calculated and provided by the software. Then, according to the 4-bit frame correction instruction information in $D_0$–$D_3$, the corresponding data are outputted without delay or outputted from the memory 25 after being delayed by the specified number of frames. For example, if the frame correction instruction information $D_0$–$D_3$ for the data in channel 0 of frame 0 indicates 0000, the data are outputted without delay. If $D_0$–$D_3$ indicate 0001, the data are controlled to be delayed by one frame from $F_n$ to $F_{n+1}$. In this case, all data are retained in order by delaying them to the point around the most delayed piece of data in a data string such that all pieces of data forming the data string are outputted in the same frame. For example, among data A, B, and C in three channels, if data C are delayed by two frames, the software instructs data A and B to be also delayed by two frames. In this case, the frame correction instruction information $D_0$–$D_3$ for data A and B indicates 0010, and data A and B are outputted as delayed by two frames. Accordingly, data A, B, and C enter the same frame in order.

The control of the delay of data in frames is explained below in detail in the cases where data A are not instructed to be delayed, data B are instructed to be delayed by one frame, and data C are instructed to be delayed by two frames. The explanation includes the operation of each part shown in FIG. 8. Frame correction instruction information shown in FIG. 11 is sent from the CPR 14 shown in FIG. 7, and the information is written by the digital terminal common (DTC) to the control channel in the frame.

In FIG. 8, the data in each channel of multiframes are inputted by the switch unit, converted into an 8-bit parallel signal by the S/P converting circuit 21, and sequentially written to the memory 25 according to write addresses generated by the counter 22. The counter operates in synchronism with multiframes shown in FIG. 9, and generates addresses according to the order from TS 0 of Frame 0 to TS 127 of frame 15.

Read addresses from the memory 25 are controlled by the read address control 24. Flags in the data channel, TS number designation data, and frame correction instruction information are read from the frame inputted by the switch unit by the control data dropper 23. According to the above described information, read addresses from the memory 25 are controlled by the read address control 24. According to the content of frame correction instruction information, the whole data are read at the time depending on the address obtained by adding a 1-frame address for data B and a 2-frame address for data C. The second selector 27 outputs inputted data without delay if the data is not instructed to be frame-delayed, and outputs data outputted to a serial signal by the P/S converting circuit 28 after being read from the memory 25 of the data is instructed to frame-delayed.

Figure 13:
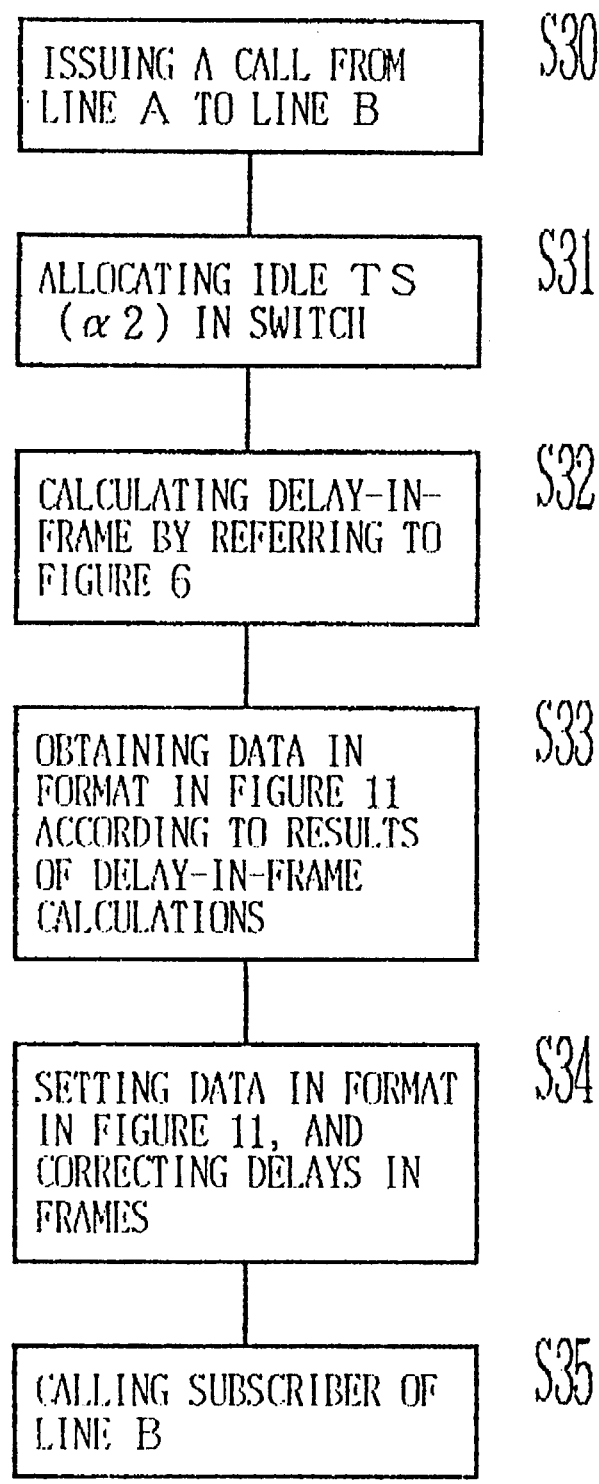
FIG. 13 is a flowchart for explaining the arithmetic operation performed by the CPR to calculate the data delay in frames.

The important part of the embodiment of the present invention is explained furthermore in detail. FIG. 13 is a flowchart for explaining the arithmetic operation performed by the data control unit 15 shown in FIG. 7 for obtaining the delay of data in frames. In step S 30 shown in FIG. 13, if a call is issued from line A to line B, for example, a time slot $\alpha_2$ indicating the idle state as a signal state between the primary time switch and the secondary time switch in the switch unit is allocated in step S 31, an arithmetic operation is performed for obtaining the delay of data in frames on the condition shown in FIG. 6 in step S 32, the information to be written to the control channel shown in FIG. 11 is calculated in step S 33, data in the format shown in FIG. 11 are set and a data delay correction instruction signal is outputted in step S 34, and a subscriber in line B is called in step S 35.

Figure 14:
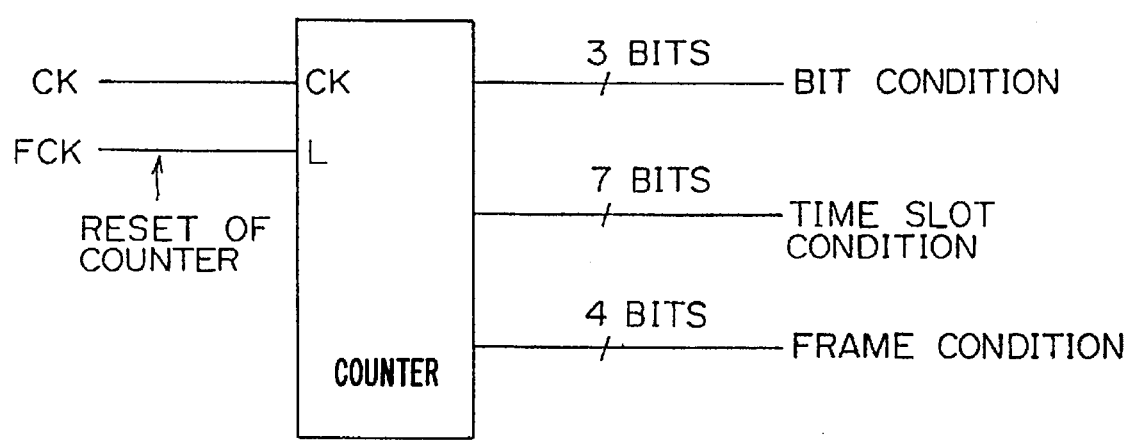
FIG. 14 is a block diagram for explaining the operation of the counter shown in FIG. 8.

FIG. 14 shows the operation of the counter 22 shown in FIG. 8. As shown in FIG. 14, the counter is reset by the signal FCK indicating the start of a multiframe explained by referring to FIG. 9, and the output value of the counter is stepped up each time a clock signal CK is inputted. According to the multiframe format shown in FIG. 9, three bits in the lowest order among fourteen bits outputted from the counter represent a bit condition indicating the position of eight bits in a time slot, the next seven bits represents a time slot condition indicating the position of 128 time slots in one frame, and four bits in the highest order represents a frame condition indicating the position of 16 frames in multiframes. As shown in FIG. 8, since data are written to the memory 25 in 8-bit units in parallel, a time slot condition and a frame condition determine a write address to the memory 25.

Figure 15:
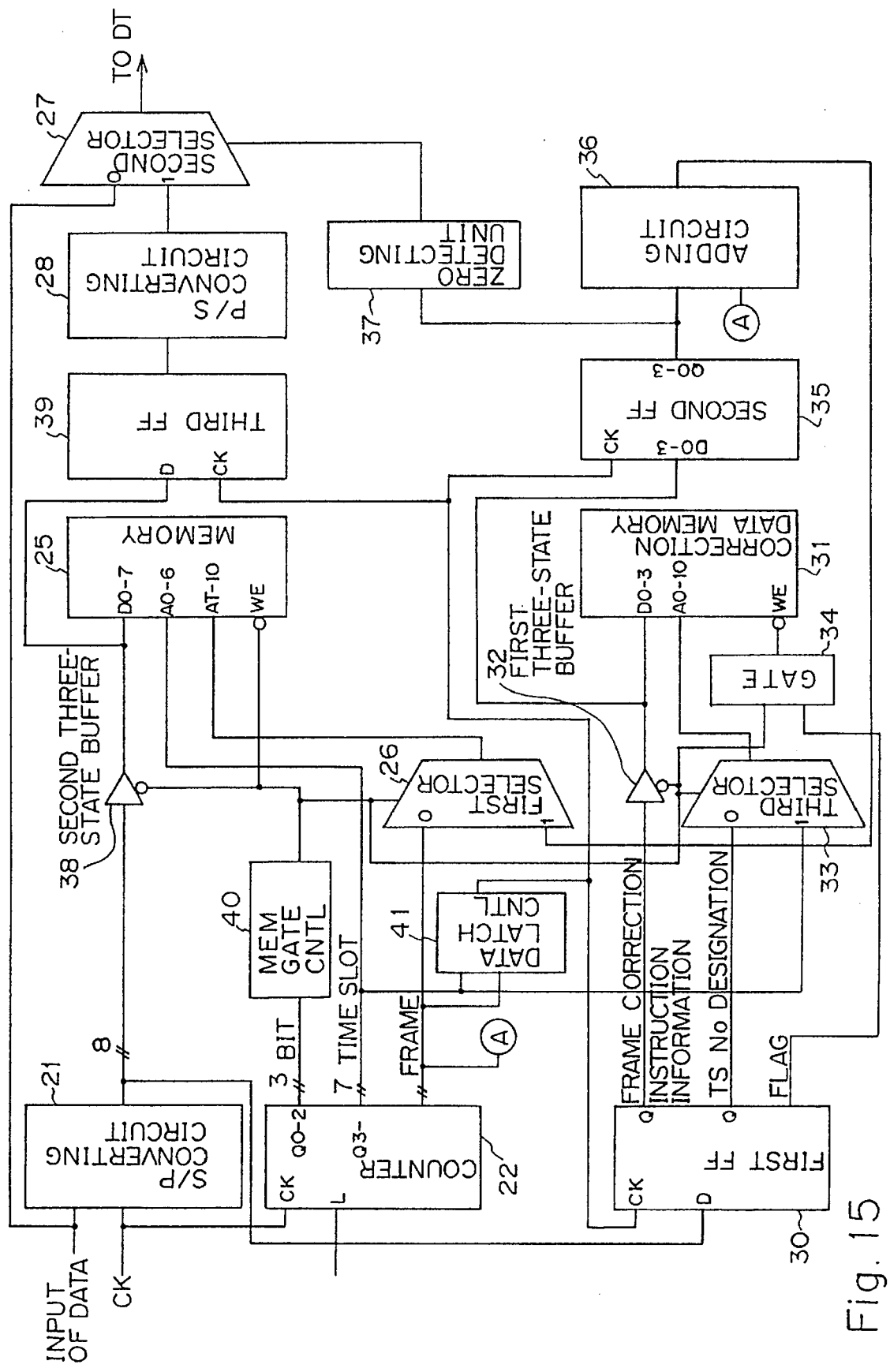
FIG. 15 is a block diagram showing the detailed configuration of the digital terminal common (DTC)

FIG. 15 is a block diagram indicating the detailed configuration of the embodiment of the digital terminal common shown in FIG. 8. In FIG. 15, the control data dropper 23 shown in FIG. 8 comprises a first flipflop 30 for latching the information written in response to the output from the S/P converting circuit 21 to the control channels described in FIG. 11, that is, flags, TS number designation, and frame correction instruction information. The read address control 24 comprises a correction data memory 31, a first three-state buffer 32, a third selector 33, a gate 34, a second flipflop 35, an adding circuit 36, and a zero detecting unit 37. The correction data memory 31 stores the frame correction instruction information from the output of the first flipflop 30. The first three-state buffer 32 is provided between the first flipflop 30 and the correction data memory 31. The third selector 33 selects a write address or a read address from the correction data memory 31 and outputs it. The gate 34 outputs a write enable signal for the correction data memory 31. The second flipflop 35 latches the frame correction instruction information read from the correction data memory 31. The adding circuit 36 adds the frame correction instruction information outputted by the second flipflop 35 to the lowest order 4-bit frame condition in the output from the counter 22 and outputs the result to the first selector 26. The zero detecting unit 37 detects zero in the output from the second flipflop 35, and has the second selector 27 select and output the data inputted from the switch unit when all the four bits outputted from the second flipflop 35 are are zero. In addition to these units, FIG. 15 contains a second three-state buffer 38 provided between the S/P converting circuit 21 and the input terminal of the memory 25, a third flipflop 39 provided between the memory 25 and the P/S converting circuit 28, a memory gate control 40 for outputting a control signal to the first and second three-state buffers 32 and 38 and the gate 34, and a data latch control 41 for outputting a clock for a data latching to the three flipflops 30, 35, and 39.

Figure 16:
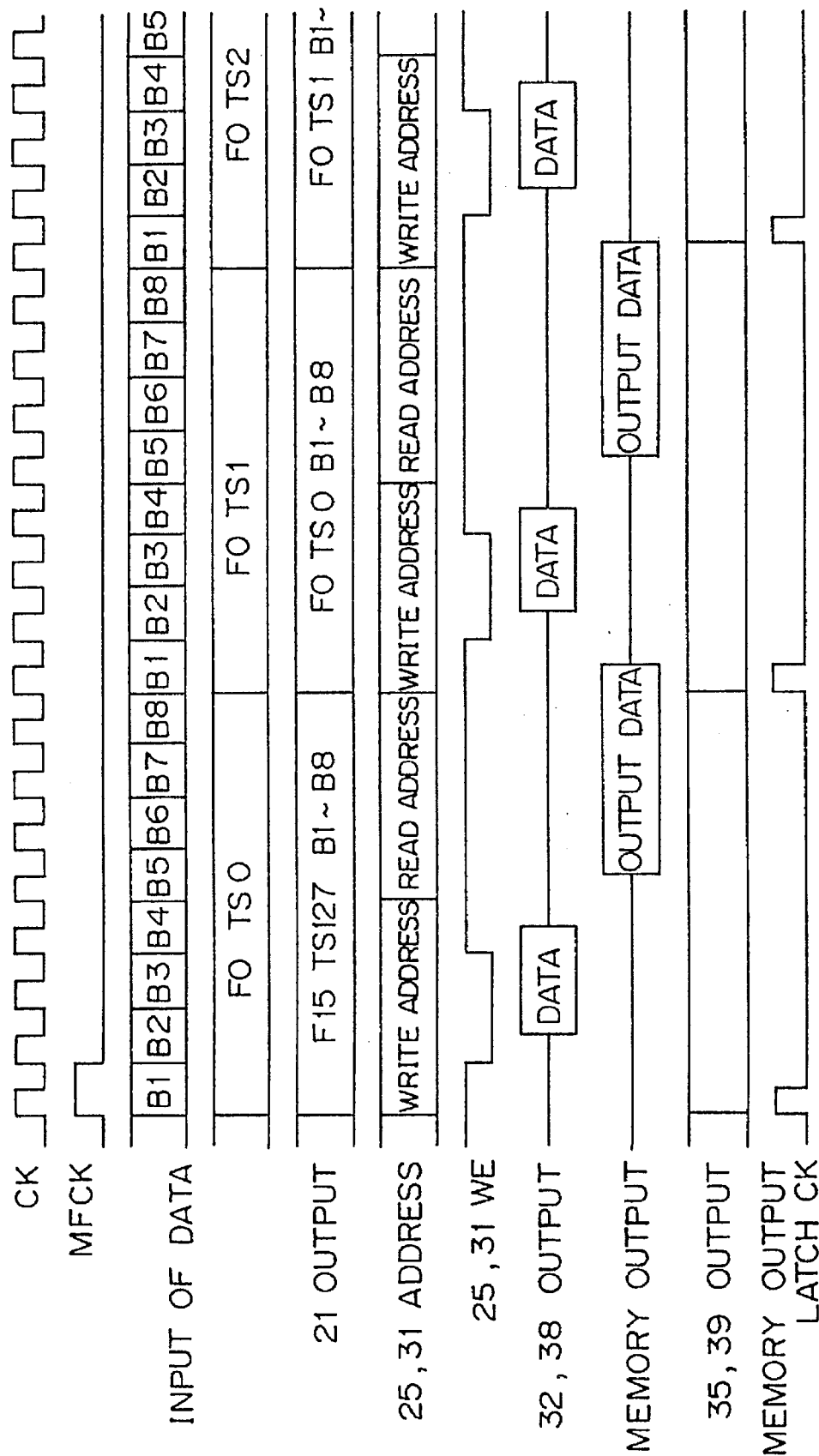
FIG. 16 is a time chart explaining the operation of each unit shown in FIG. 15.
Figure 17:
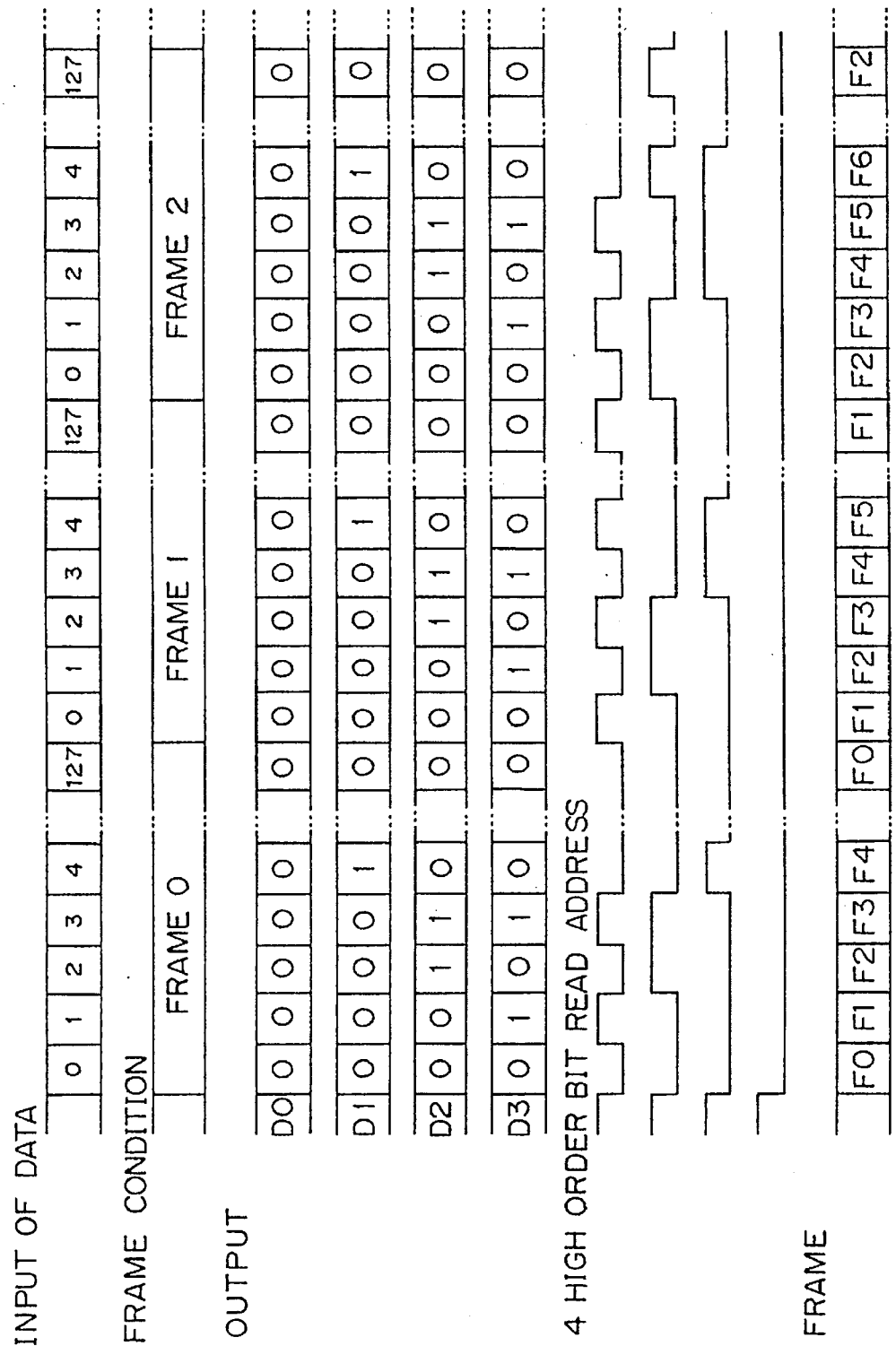
FIG. 17 shows an example of the relationship between the frame correction instruction information shown in FIG. 15 and the read address in the data from the memory.

FIG. 16 is a time chart indicating the operation of each unit shown in FIG. 15. FIG. 17 shows the relationship between the frame correction instruction information shown in FIG. 15 and the read address of the data read from a memory. The operation of each unit shown in FIG. 15 is explained in detail by referring to FIGS. 16 and 17.

The data inputted by the switch unit in the format described in FIG. 9 are converted to 8-bit parallel data by the S/P converter 21 as shown in FIG. 16. The conversion causes a delay by one time slot as shown in FIG. 16. If the counter 22 synchronizes with multiframes as described above, the outputs from the counter 22, that is, a time slot condition and a frame condition, are delayed by one time slot and stored in the memory 25 as a write address so that the memory 25 stores the data of TS 0 in frame 0 starting from address 0.

The memory gate control 40 shown in FIG. 15 issues a control signal, used in writing data in the memory 25, to the second three-state buffer 38, and outputs a write enable signal to the memory 25. The write enable signal is commonly used by the correction data memory 31 as shown in FIG. 16. A write address and a read address for the memory 25 are assigned by a switching operation by the selector 26 such that, as shown in FIG. 16, the area from bit B1 to bit B4 contains a write address, and the area from bit B5 and bit B8 contains a read address.

The first flipflop 30 shown in FIG. 15 latches data in control channels as described above, and a clock for the latch is generated by the data latch control 41 according to the 4-highest-order-bit frame condition and the next 7-bit time slot condition in the output from the counter 22.

The frame correction instruction information in the output from the first flipflop 30 is provided as data for the correction data memory 31. The TS number designation information is provided as a write address for the correction data memory 31 through the third selector 33. A 1-bit flag is provided for the gate 34. If the flag indicates "1", a write enable signal is outputted from the gate 34 to the correction data memory 31 according to the data latch clock. At this time, the frame correction instruction information is stored in the correction data memory 31.

In reading data from the correction data memory 31, a time slot condition outputted by the counter 22 is provided as a read address to the memory 31 through the third selector 33, and the read data are latched in the second flipflop 35. The latch clock is generated by the data latch control 41 as described above, and the clock is positioned at a switch point from bit B1 to bit B8 as shown in FIG. 16. As a result, the frame correction instruction information is outputted in synchronous with the input data as explained by referring to FIG. 12.

The output from the second flipflop 35 is added by the adding circuit 36 to the four highest order bits in the output from the counter 22, that is, a frame condition, and provided through the first selector 26 as the four highest order bits in a read address of the memory 25. The four highest order bits in the read address correspond to a frame condition as described above, and the data outputted from the memory 25 are delayed in frames according to the frame correction instruction information by adding the frame condition outputted by the counter 22 to the output from the second flipflop 35, that is, frame correction instruction information. This is indicated in FIG. 17. For example, the output from the second flipflop 35, that is, the frame correction instruction information, is "0001" for the inputted data in TS1 of frame 0. According to this, the inputted data are delayed and outputted to frame 1.

In FIG. 15, the data outputted from the memory 25 are latched in the third flipflop 39 in an 8-bit length, and the latched data are converted to a serial signal in the format of the inputted data by the P/S converting circuit 28. The second selector 27 selects whether the data inputted from the switch unit are outputted without delay, or the data from the memory 25 are outputted after being delayed. The selection condition is provided by the zero detecting unit 37. The zero detecting unit 37 detects according to the output from the second flipflop 35 whether or not the frame correction instruction information is "0000" If the information indicates "0000", the second selector 27 is controlled such that the data inputted from the switch unit are selected. Thus, the inputted data, the output from the P/S converting circuit 28, and the frame correction instruction information outputted by the second flipflop 35 are synchronized.

As described above in detail, in the present invention, transmission data are temporarily stored in a memory to control the data in order according to the software-predetermined delay information for each piece of data corresponding to a channel. Thus, a data frame synchronous method can be realized in the PCM transmission line, and can be utilized efficiently in practical use.

Since the present invention corrects data delay in frames in the PCM transmission line, it can be applied in various fields in data communication technologies.

What is claimed is:

1. A delay-in-frames correcting system operated in a switch unit of a bidirectional PCM transmission line having a plurality of channels carrying data, the switch unit receiving frames of the data, each frame having a plurality of time slots corresponding to the channels, the switch unit connected to the PCM transmission line via inputs on an input side and outputs on an output side, said system comprising:

a plurality of channel data storage means, at least one provided for each direction of the bidirectional PCM transmission line, for temporarily storing channel-correspondence data; and data delay control means for delaying the channel correspondence data according to most-delayed data, determined by frame correction instruction information, included among the channel-correspondence data stored in said channel data storage means to prevent discrepancies among the frames by outputting the frame correction instruction information to output in a single frame all of the channel-correspondence data received in the single frame.

2. The delay-in-frames system according to claim 1, wherein said system comprises the switch unit comprising a time-space-time switch operatively connected to apply a data frame to a primary time switch, a space switch, and a secondary time switch in that order, the data frame in said time-space-time switch comprising 1,024 time slots, and wherein said system comprises call processor means forming said data delay control means for defining no delay if the following pair of equations is satisfied:

$$\alpha_1 \leq \alpha_2 < 510 \text{ and } \alpha_2 + 513 \leq \alpha_3$$

wherein data in each channel in said frame when they are applied to said primary time switch is a standard value of "$\alpha_1$", the position between said primary time switch and said secondary time switch is "$\alpha_2$", and the position at the output from said second time switch is "$\alpha_3$".

3. The delay-in-frames correcting system according to claim 1, wherein said system comprises the switch unit comprising a time-space-time switch operatively connected to apply a data frame to a primary time switch, a space switch, and a secondary time switch in that order, the data frame in said time-space-time switch comprises 1,024 time slots, and wherein said system comprises call processor means forming said data delay control means for defining a 1-frame delay if one of the following pairs of equations is satisfied:

$$\alpha_1 \leqq \alpha_2 < 510, \text{ and } \alpha_2 + 513 > \alpha_3$$

$$\text{or } \alpha_1 \leqq \alpha_2, \alpha_2 \geqq 511, \text{ and } \alpha_2 - 511 \leqq \alpha_3$$

$$\text{or } \alpha_1 > \alpha_2, \alpha_2 511, \text{ and } \alpha_2 + 511 \leqq \alpha_3$$

wherein data in each channel in said frame when they are applied to said primary time switch is a standard value of "$\alpha_1$", the position between said primary time switch and said secondary time switch is "$\alpha_2$", and the position at the output from said second time switch is "$\alpha_3$".

4. The delay-in-frames correcting system according to claim 1, wherein said system comprises the switch unit comprising a time-space-time switch operatively connected to apply a data frame to a primary time switch, a space switch, and a secondary time switch in that order, the data frame in said time-space-time switch comprises 1,024 time slots, and wherein said system comprises call processor means forming said data delay control means for defining a 2-frame delay if one of the following pairs of equations is satisfied:

$$\alpha_1 > \alpha_2, \alpha_2 < 511, \alpha_2 + 513 > \alpha_3$$

$$\text{or } \alpha_1 > \alpha_2, \alpha_2 \geqq 511, \text{ and } \alpha_2 - 511 \leqq \alpha_3$$

$$\text{or } \alpha_1 \leqq \alpha_2, \alpha_2 \geqq 511, \text{ and } \alpha_2 - 511 > \alpha_3$$

wherein data in each channel in said frame when they are applied to said primary time switch is a standard value of "$\alpha_1$", the position between said primary time switch and said secondary time switch is "$\alpha_2$", and the position at the output from said second time switch is "$\alpha_3$".

5. The delay-in-frames correcting system according claim 1, wherein said system comprises the switch unit comprising a time-space-time switch operatively connected to apply a data frame to a primary time switch, a space switch, and a secondary time switch in that order, the data frame in said time-space-time switch comprising 1,024 time slots, and wherein said system comprises call processor means forming said data delay control means for defining a 3-frame delay if the following pair of equations is satisfied:

$$\alpha_1 > \alpha_2, \alpha_2 \geqq 511, \text{ and } \alpha_2 - 511 > \alpha_3$$

wherein data in each channel in said frame when they are applied to said primary time switch is a standard value of "$\alpha_1$", the position between said primary time switch and said secondary time switch is "$\alpha_2$", and the position at the output from said second time switch is "$\alpha_3$".

6. The delay-in-frames correcting method according to claim 5, wherein said call processor means comprises means to allocating a time slot in an idle state in said switch unit as the position $\alpha_2$ for a call from line A to line B, for calculating a delay in frames using the values of the positions $\alpha_1$ and $\alpha_3$, for calculating frame correction instruction information according to the pair of equations, for issuing an instruction to set the frame correction instruction information and to correct the delay in frames, and for calling a subscriber in line B.

7. The delay-in-frames correcting system according to claim 1, wherein a frame associated with the channel-correspondence data stored in said channel data storage means has a multiframe configuration in which one time slot comprises a number t of bits, one frame comprises a number n of time slots, and one multiframe comprises a number N of frames.

8. The delay-in-frames correcting system according to claim 1, wherein said channel data storage means comprises:

serial-to-parallel converting circuit means for parallelly converting data corresponding to each channel in a frame, memory means for storing the output from said serial-to-parallel converting circuit means corresponding to each channel, and parallel-to-serial converting circuit means for serially converting the parallel output obtained from said memory means corresponding to each channel.

9. The delay-in-frames correcting system according to claim 1, wherein said channel data storage means comprises:

serial-to-parallel converting circuit means for parallelly converting data corresponding to each channel in a frame, memory means for storing the output from said serial-to-parallel converting circuit means corresponding to each channel, and parallel-to-serial converting circuit means for serially converting the parallel output obtained from the memory means corresponding to each channel, wherein said data delay control means comprises call processor means for setting a path in said switch unit and outputting the frame correction instruction information, and wherein said system further comprises:

counter means for generating a write address in writing the output from said serial-to-parallel converting circuit means to said memory means for said channel data storage means and said data delay control means, first selector means for providing the output from said counter means as a writing address for said memory means, control data dropper means for searching the output from said serial-to-parallel converting circuit means for delay-in-frames correction instruction information outputted by said call processor means, and read address control means for providing a data read address from said memory means for said memory means through said first selector means according to the output from said control data dropper means, and for outputting a selection control signal for said second selector means.

10. The delay-in-frames correcting means according to claim 9, wherein said control data dropper means comprises means for searching the output from said serial-to-parallel converting circuit means for, in addition to the frame delay correction instruction information written to a control channel in a frame applied to said serial-to-parallel converting circuit means, a flag indicating the validity or invalidity of data and a time slot number indicating the number of a time slot to be corrected for its frame.

11. The delay-in-frames correcting means according to claim 9, wherein a frame associated with the channel-correspondence data stored in said channel data storage means has a multiframe configuration where one time slot comprises a number t of bits, one frame comprises a number n of time slots, and one multiframe comprises a number N of frames, wherein said counter means is reset at the start of the multiframe and is stepped up by a clock having a cycle corresponding to one bit in t bits forming said time slot, and wherein said counter means outputs, as a write address to said memory means a frame condition bit, the highest order bit in the outputs from said counter means indicating the position of a specified frame in the multiframe and outputs a time slot condition bit, the next bit following the frame condition bit in outputs from said counter means, wherein in the frame a specified time slot is positioned.

12. The delay-in-frames correction system according to claim 11, wherein said read address control means comprises means for outputting to said first selector means, as a read address of the data from said memory means, a sum of the frame delay correction instruction information and the frame condition bit.

13. The delay-in-frames correcting system according to claim 11, wherein said control data dropper means comprises first flipflop means for latching, in addition to said frame correction instruction information, a flag indicating the validity or invalidity of data and a time slot number to correct a delay in frames, wherein said read address control means comprises:

correction data memory means for storing the frame correction instruction information in outputs from said first flipflop means, first three-state buffer means for controlling the time of storing in said correction data memory means the frame correction instruction information outputted by said first flipflop means, third selector means for selecting either a time slot number outputted by said first flipflop means or a time slot condition bit outputted by said counter means and for providing the result to said correction data memory means as a write address or a read address, gate means for outputting a write enable signal to said correction data memory means when a flat outputted by said first flipflop means indicates the validity of data, second flipflop means for latching the frame correction instruction information outputted from said correction data memory means, adding circuit means for adding the frame correction instruction information and a frame condition bit to provide a sum for said first selector means as a data read address from said memory means, and zero detecting means for selecting and outputting data inputted to said serial-to-parallel converting circuit means to said second selector means when detecting as totally zero said frame correction instruction information outputted by said second flipflop means, and wherein said system further comprises:

a second three-state buffer operatively connected between the output terminal of said serial-to-parallel converting circuit means and the data input terminal of said memory means, a third flipflop operatively connected between the data output terminal of said memory means and the input terminal of said parallel-to-serial converting circuit means, memory gate control means for receiving a bit condition, outputted by said counter means, indicating a bit position in a time slot, and outputting a control signal to said first selector means, first three-state buffer means, gate means, and second three-state buffer, and data latch control means for receiving a frame condition bit and a time slot condition bit in the outputs of said counter means, and outputting a data latch clock to said first flipflop means, second flipflop means, and third flipflop.

14. The delay-in-frames correcting method according to claim 2, wherein said call processor means comprises means for allocating a time slot in an idle state in said switch unit as the position $\alpha_2$ for a call from line A to line B, for calculating a delay in frames using the values of the positions $\alpha_1$ and $\alpha_3$, for calculating frame correction instruction information according to the pair of equations, for issuing an instruction to set the frame correction instruction information and to correct the delay in frames, and for calling a subscriber in line B.

15. The delay-in-frames correcting method according to claim 3, wherein said call processor means comprises means for allocating a time slot in an idle state in said switch unit as the position $\alpha_2$ for a call from line A to line B, for calculating a delay in frames using the values of the positions $\alpha_1$ and $\alpha_3$, for calculating frame correction instruction information according to the pair of equations, for issuing an instruction to set the frame correction instruction information and to correct the delay in frames, and for calling a subscriber in line B.

16. The delay-in-frames correcting method according to claim 4, wherein said call processor means comprises means for allocating a time slot in an idle state in said switch unit as the position $\alpha_2$ for a call from line A to line B, for calculating a delay in frames using the values of the positions $\alpha_1$ and $\alpha_3$, for calculating frame correction instruction information according to the pair of equations, for issuing an instruction to set the frame correction instruction information and to correct the delay in frames, and for calling a subscriber in line B.

17. An apparatus coupled to a time-space-time switch having an input and an output, and supplied with associated channel data in a frame, comprising:

a channel data storage unit coupled to one of the input and the output, to temporarily store the associated channel data; and a data delay control unit coupled to the channel data storage unit, to correct a delay-in-frames of the associated channel data by detecting most-delayed channel data in the associated channel data in the frame and delaying the associated channel data to prevent discrepancies among the frames as necessary so that all of the associated channel data are delayed as much as the most-delayed channel data in the associated channel data.

18. An apparatus operatively coupled to a switching system having an input and an output, and supplied with associated channel data in a frame, comprising:

a channel data storage unit operatively coupled to one of the input and the output, to temporarily store the associated channel data; and a data delay control unit operatively coupled to the channel data storage unit, to correct a delay-in-frame of the associated channel data by detecting a delay of most-delayed channel data in the associated channel data in the frame and delaying the associated channel data based on the delay of the most-delayed channel data to prevent discrepancies among frames.

19. A method of correcting an associated channel data in a frame, comprising the steps of:
(a) receiving associated channel data in a frame;
(b) temporarily storing the associated channel data;
(c) detecting a delay of most-delayed channel data in the associated channel data in the frame; and
(d) delaying the associated channel data based on the delay detected in step (c) to prevent discrepancies among frames.

* * * * *

UNITED STATES PATENT AND TRADEMARK OFFICE
CERTIFICATE OF CORRECTION

PATENT NO.   :   5,654,967
DATED        :   August 5, 1997
INVENTOR(S)  :   Yuzo OKUYAMA, et al.

It is certified that error appears in the above-indentified patent and that said Letters Patent is hereby corrected as shown below:

<u>Column 4</u>

Line 43, "Secondary" should be --secondary--.

Line 63, "$_3$," should be --$a_3$,--.

<u>Column 11</u>

Line 6, after "$a_2$" (second occurrence) insert --<--.

Signed and Sealed this

Twenty-third Day of December, 1997

*Attest:*

BRUCE LEHMAN

*Attesting Officer*     *Commissioner of Patents and Trademarks*